United States Patent [19]

Tavernier et al.

[11] Patent Number: 5,247,987
[45] Date of Patent: Sep. 28, 1993

[54] SIDE DAM OF AN INSTALLATION FOR THE CONTINUOUS CASTING OF METALS BETWEEN ROLLS

[75] Inventors: Hervé Tavernier, Metz; Christophe Ganser, Fameck, both of France

[73] Assignees: Usinor Sacilor, Puteaux, France; Thyssen Stahl Aktiengesellschaft, Duisburg; Thyssen Edelstahlwerke AG, Krefeld, both of Fed. Rep. of Germany

[21] Appl. No.: 825,574

[22] Filed: Jan. 24, 1992

[30] Foreign Application Priority Data

Jan. 25, 1991 [FR] France .............................. 91 01061

[51] Int. Cl.$^5$ .............................................. B22D 11/06
[52] U.S. Cl. .................................. 164/428; 164/480
[58] Field of Search .............................. 164/428, 480

[56] References Cited

FOREIGN PATENT DOCUMENTS 0279673 8/1988 European Pat. Off. .
362721 4/1990 European Pat. Off. ............ 164/480
3230107 3/1984 Fed. Rep. of Germany .

OTHER PUBLICATIONS

Patent Abstracts of Japan, vol. 14, No. 237 (M-097), May 21, 1990, & JP-A-2 063 669, Mar. 2, 1990, Y. Yoshiaki, "Internal Chill Body".
Patent Abstracts of Japan, vol. 10, No. 323 (M-531) [2379], Nov. 5, 1986, & JP-A-61-129260, Jun. 17, 1986, S. Nakato, et al. "Synchronous Type Continuous Casting Machine".
Patent Abstracts of Japan, vol. 9, No. 330 (M-442) [2053], Dec. 25, 1985, JP-A-60-162557, Aug. 24, 1985, J. Kadoi, et al., "Continuous Casting Device for Thin Plate".

Primary Examiner—Kuang Y. Lin
Attorney, Agent, or Firm—Oblon, Spivak, McClelland, Maier & Neustadt

[57] ABSTRACT

The side dam comprises a layer in contact with the molten metal constituted by a refractory material of fibrous structure and composed mainly of alumina and silica, and a second layer which is provided behind the first layer and composed of compact refractory material. The fibrous layer ensures the thermal insulation and the compact layer acts as a safety plate. The invention permits the construction of side dams which are capable of both durably ensuring the sealing of the molten metal and preventing untimely solidifications of the metal upon contact with these side dams. The invention is preferably applied to the continuous casting between rolls of hard metals having a high melting temperature, such as iron and its alloys.

9 Claims, No Drawings

SIDE DAM OF AN INSTALLATION FOR THE CONTINUOUS CASTING OF METALS BETWEEN ROLLS

FIELD OF THE INVENTION

The invention relates to the continuous casting of metals, in particular steel, between rolls.

It is known that one of the main difficulties at the present time in the carrying out of this method for casting hard metals having a high melting temperature, such as iron and its alloys, resides in the closure of the ends of the casting space defined by the rolls.

Closing elements which may be used for this purpose, more commonly termed "side dams", must indeed be capable of both durably sealing off the molten metal and preventing untimely solidifications of this metal upon contact with the closing element.

DESCRIPTION OF THE PRIOR ART

The side dams of refractory material proposed in prior art disclosures still too imperfectly meet this double requirement (FR-A-2,613,646, JP-A-579,565).

An object of the invention is to provide a decisive solution of this problem.

SUMMARY OF THE INVENTION

To this end, the invention provides a side dam for closing the ends of the casting space of an installation for the continuous casting of metals between rolls, comprising a part in contact with the cast metal constituted by a refractory material, characterized in that said material has a fibrous structure and is composed of alumina and silica in the proportion of respectively about 70 to 98% and 30 to 2% by relative weight.

Advantageously, in the case of the casting of stainless steels, said refractory material is impregnated with a gel principally comprising zirconia.

The invention also provides a side dam of this type, the refractory part being constituted by two juxtaposed layers, characterized in that the first layer, intended to come into contact with the cast metal, is constituted by a fibrous refractory material, as mentioned before, having high heat insulating properties, and the second layer, intended to ensure the rigidity and the mechanical resistance of the assembly, is formed by a compact refractory material having low thermal expansion properties.

As will have been understood, at the start of a casting operation, the fibrous refractory layer rich in $Al_2O_3$ ensures in the new state, i.e. before any wear thereof, the thermal insulation which permits avoiding the untimely solidifications of the cast metal on the side dams.

It will be recalled that these spurious solidifications, when they occur, constitute bridges which interconnect, upstream of the neck between the rolls, the ends of the skins solidified or frozen on the rolls. There may in this way be formed veritable blocking wedges which are incapable, owing to their hardness, of passing between the rolls, which within a short time brings about the final interruption of the casting operation.

Thereafter, in the course of the initial stage of the casting, the fibrous layer becomes hollowed out by a mechanical erosion produced by the cast metal. It then gradually loses its thermal insulating properties. However, the side dam is at the same time heated. When this equilibrium is reached, and maintained by the permanent supply of molten metal to be cast, solidifications are no longer to be feared. If the initial thickness of the fibrous layer is arranged to be sufficient not to be passed through by the molten metal at this moment, the wearing away is stabilized and the casting operation can continue to its term without any particular difficulty.

This being so, the compact refractory layer behind the fibrous layer advantageously constitutes in this respect a safety plate which will contain, if need be, the liquid metal if the casting is prolonged beyond the complete erosion of the fibrous material.

As a metallic cover preferably protects the refractory part and improves the mechanical performance of the assembly, the compact layer will be advantageously chosen from a refractory material having a low thermal expansion, such as melted vitreous silica or an aluminous concrete.

When casting stainless steels, it is an advantage to impregnate the fibrous material with zirconia, in the known manner, in order to improve its resistance to corrosion. After impregnation, the content of $ZrO_2$ may vary between 15 and 70% by weight of the compound alumina, silica and zirconia, the percentages of alumina and silica above mentioned relating only to the sum of both these components.

As a not limitative numerical example, such a material can comprise 37% of alumina, 4% of silica, 57% of zirconia. Before impregnation, it has a specific mass of 230 kg/m3 and after impregnation, of 430 kg/m3. Its thermal conductibility, at 1000° C., is 0,2 watt/m/°K.

What is claimed is:

1. A side dam for closing ends of a casting space of an installation for the continuous casting of metal between rolls, said side dam comprising a part for contact with the cast metal and constituted by a refractory material, said material having a fibrous structure and being composed
of alumina and silica in the proportion respectively of about 70 to 98% and 30 to 2% by weight.

2. A side dam according to claim 1, wherein said refractory material is furthermore impregnated with zirconia.

3. A side dam according to claim 2, wherein said refractory material, after being impregnated with zirconia, has a content of $ZrO_2$ of between 15 and 70% by weight based on the total amount of alumina, silica and zirconia.

4. A side dam for closing ends of a casting space of an installation for the continuous casting of metal between rolls, said side dam comprising a refractory part constituted by two juxtaposed layers, a first layer of said layers being intended to be put in contact with the cast metal and formed by a fibrous refractory material comprising alumina and silica having high thermal insulating properties, and a second layer of said layers for ensuring rigidity and strength of said refractory part and being formed by a compact refractory material having low thermal expansion properties.

5. A side dam according to claim 3, wherein said compact refractory material is melted vitreous silica.

6. A side dam according to claim 3, wherein said compact refractory material is an aluminous concrete.

7. A side dam for closing ends of a casting space of an installation for the continuous casting of metal between rolls, said side dam comprising a refractory part constituted by two juxtaposed layers, a first layer of said layers being intended to be put in contact with the cast metal and formed by a fibrous refractory material comprising alumina and silica having high thermal insulating properties, and a second layer of said layers for ensuring rigidity and strength of said refractory part and being formed by a compact refractory material having low thermal expansion properties wherein said fibrous refractory material comprising alumina and silica is composed of alumina and silica in the proportion of respectively 70 to 98% and 30-2% by weight.

8. A side dam according to claim 7, wherein said compact refractory material is melted vitreous silica.

9. A side dam according to claim 7, wherein said compact refractory material is an aluminous concrete.

* * * * *